US006449260B1

United States Patent
Sassin et al.

(10) Patent No.: US 6,449,260 B1
(45) Date of Patent: Sep. 10, 2002

(54) MULTIMEDIA AUTOMATIC CALL DISTRIBUTION SYSTEM

(75) Inventors: Michael Sassin, San Jose, CA (US); Markku Korpi, Starnberg (DE); Richard W. Crouch, Gustine, CA (US); Leon Xu; Uwe Wrede, both of San Jose, CA (US); Robert W. Stephens, Sunnyvale, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/071,759

(22) Filed: May 1, 1998

(51) Int. Cl.[7] .......................... H04Q 9/02; H04L 12/66
(52) U.S. Cl. ...................... 370/270; 370/352; 370/389; 370/401; 379/265
(58) Field of Search ................ 379/258, 265; 370/270, 352, 389, 400, 401

(56) References Cited

U.S. PATENT DOCUMENTS

| | | | | |
|---|---|---|---|---|
| 5,450,482 A | * | 9/1995 | Chen | 379/207 |
| 5,884,032 A | * | 3/1999 | Bateman et al. | 709/204 |
| 5,920,621 A | * | 7/1999 | Gotlieb | 379/265 |
| 5,999,965 A | * | 12/1999 | Kelly | 709/202 |
| 6,061,347 A | * | 5/2000 | Hollatz | 370/352 |
| 6,122,364 A | * | 9/2000 | Petrunka | 379/265 |

* cited by examiner

*Primary Examiner*—Alpus H. Hsu
*Assistant Examiner*—Robert Stevens

(57) ABSTRACT

An automatic call distribution system utilizes a number of H.323 compatible devices. An automatic call distribution (ACD) server (52) interfaces with a computer telephony interface gateway (54) to route calls to agents or to a music/video server (56). Calls are received by a gateway and supplied to a gatekeeper that determines an IP address of the destination. The ACD server selects the destination in response to the number of agents available. In addition, customer calls can be received via e-mail, facsimile or the Internet. The call distribution system can instruct an agent to return an e-mail or facsimile message or to call a customer if desired. Calls from one H.323 device can be routed to another H.323 device by a third party application by sending a call control message to the device's application program interface that executes the message as if it were generated at the device itself.

4 Claims, 8 Drawing Sheets

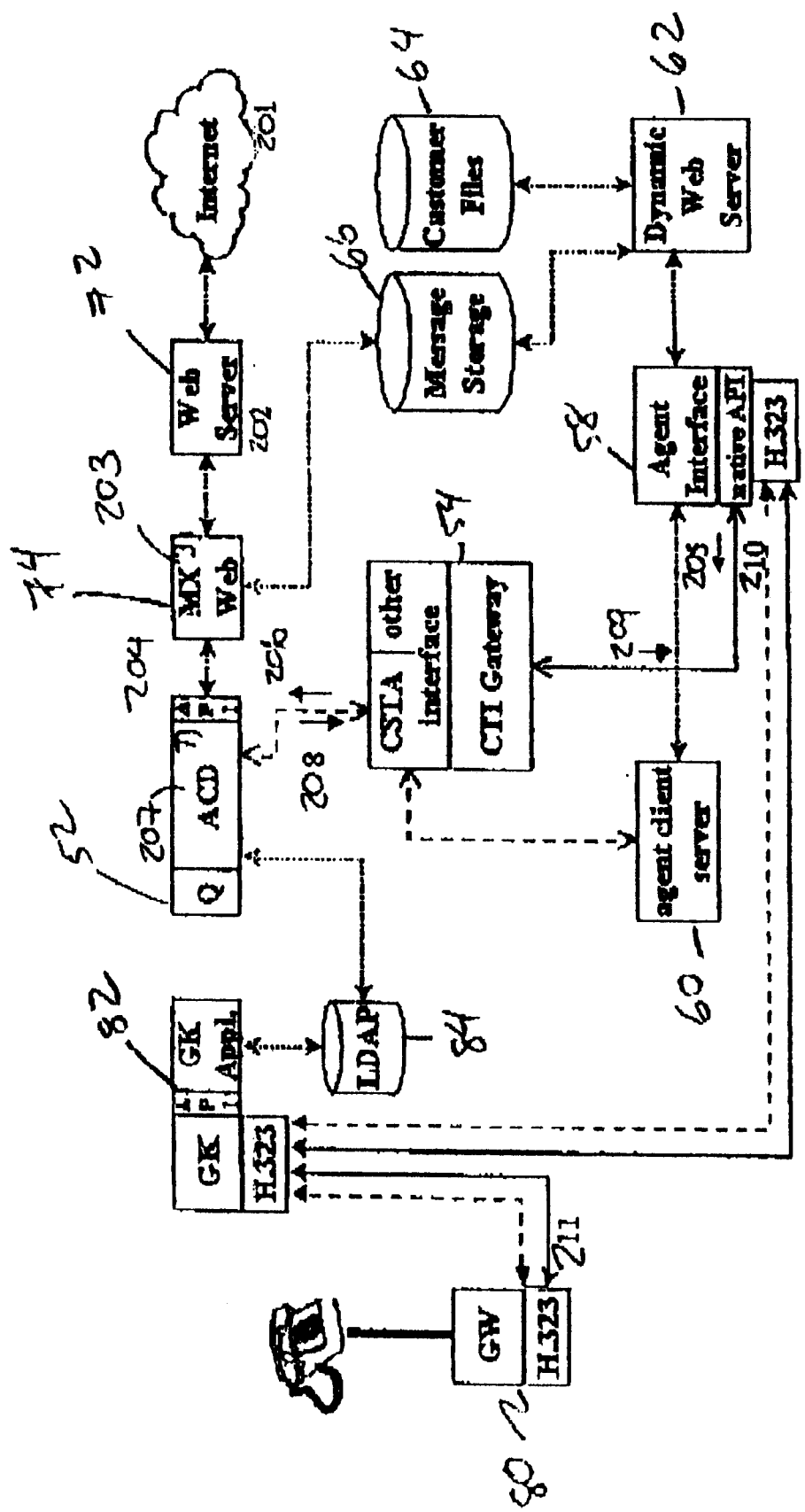

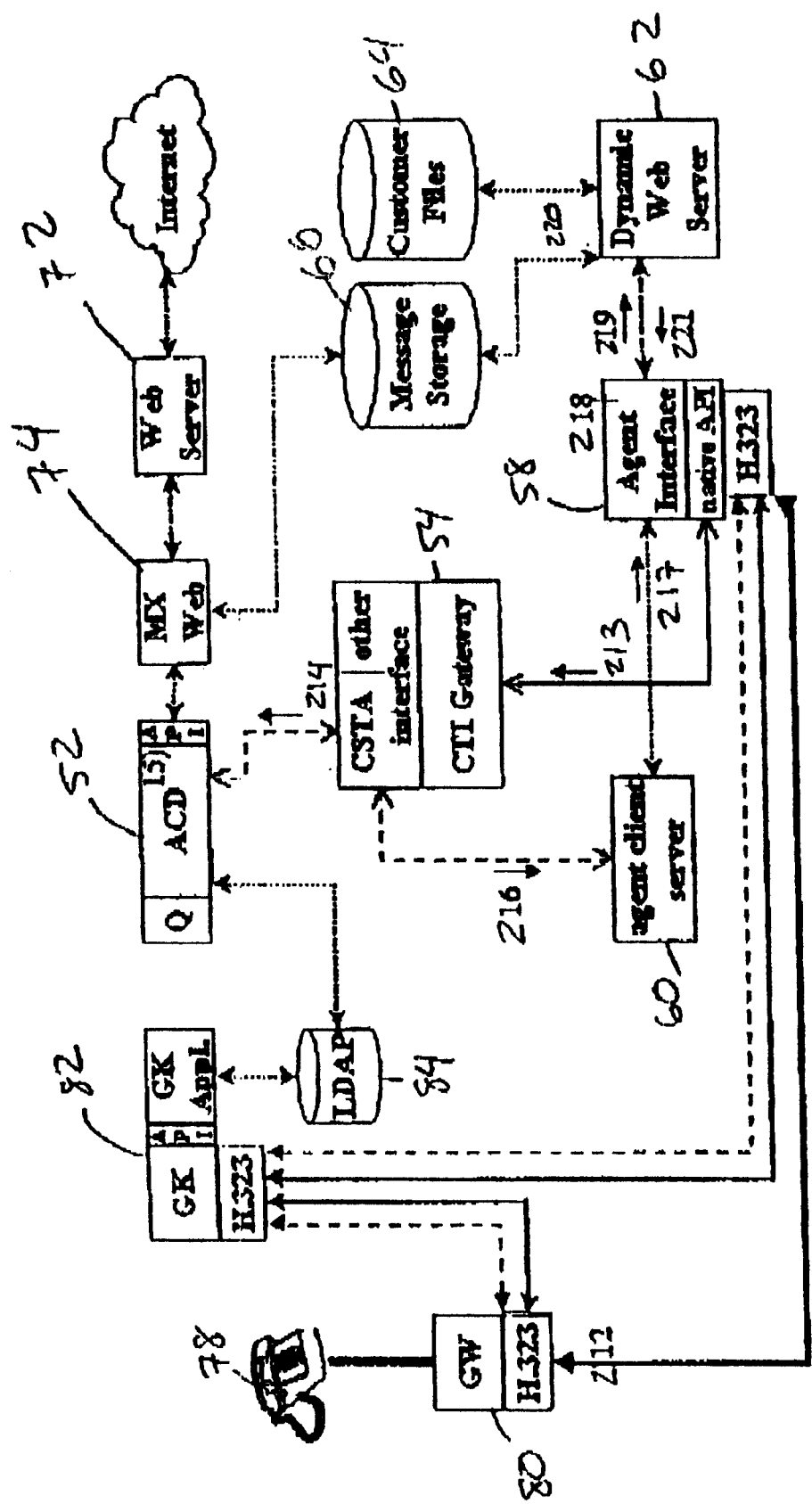

MULTIMEDIA AUTOMATIC CALL DISTRIBUTION SYSTEM

FIELD OF THE INVENTION

The present invention relates to communication systems in general and in particular to multimedia call processing systems.

BACKGROUND OF THE INVENTION

Call centers are commonly provided by companies who field telephone calls from large numbers of people. For example, airlines provide call centers to allow customers to make travel arrangements. Brokerage firms provide call centers to allow clients to buy and sell securities and many consumer companies provide call centers to provide technical assistance regarding their products or to answer consumer questions.

The traditional manner of constructing a call center is to utilize one or more private branch exchanges (PBX). A PBX connects a number of telephones to the public switched telephone network. Software within the PBX routes an incoming call to an available customer agent at one of the telephones if an agent is available. Alternatively, the PBX places a call on hold until an agent is free. The capacity of the system to handle increased numbers of telephone calls is generally increased by adding additional PBXs and additional customer agents.

While this traditional call center architecture has been used successfully in the past, it has several shortcomings. For example, the traditional PBX-based call center is only equipped to handle voice telephone calls. As computers become more prevalent, many people wish to interact with an agent via an alternative media such as via fax, via e-mail or via the World Wide Web. Furthermore, telephone calls need not be received from the public switched telephone network, but could also be received on a local intranet or a wide area computer network such as the Internet. While it has been feasible to provide these capabilities separately, the results have been a non-homogenous system that cannot be operated in a seamless manner by the agents.

In addition, the traditional PBX-based call center requires that all the agents be at a central location in order to answer telephone calls. However, many companies are utilizing teleworking, wherein an agent can work from home in order to reduce company overhead. However, it has not previously been practical to design an automatic call distribution center that facilitates agents working outside the office. With a PBX, a voice and separate data connection were required for a teleworker. The voice connection is typically implemented using a voice connection through the PSTN. The data connection is needed to allow the agent to connect to order entry systems or customer service databases. The data connection is made by a separate modem or PPD connection. Establishing both connections in a conventional center is complicated and expensive.

Given the shortcomings in the art, there is a need for a call processing system that can communicate with a caller via a number of different media that can facilitate agents working from various locations. In addition, the system should be modular in order to reduce the cost of any one component but still be able to operate in an integrated fashion.

SUMMARY OF THE INVENTION

The present invention is a networked call center system that is adapted to handle calls from customers via different media and to route the calls to a customer service agent. The system includes a gateway that receives telephone calls from the public switched telephone network and a gatekeeper that determines an address of a destination where the call should be routed.

A number of agent terminals are coupled to the network and receive a call when a customer service agent is available. An automatic call distribution server monitors the status of the agent terminals and routes a call to an agent terminal when an agent is available.

The call distribution system further includes an e-mail and web server application that receives inquiries from customers and routes the inquiries to the ACD server. A music/video server is provided to produce audio and video background music and announcements for a call when no agent terminal is available. An Interactive Voice Response (IVR) unit can also be coupled to the network to help quantify the nature of a call and in some cases process the call without interaction with an agent. A firewall and Internet server are also coupled to the network to receive calls from an Internet Protocol computer network. In the presently preferred embodiment of the invention the gateway, gatekeeper, automatic call distribution server and audio/video server and IVR unit are H.323 compatible to handle multimedia calls.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 7 and 8 illustrate how the automatic call distribution system responds to call-back requests received via the World Wide Web.

The present invention is an automatic call distribution system that allows a customer service agent to interact with callers through a variety of different media.

The call distribution system is able to respond to telephone calls received from a public switched telephone network, from a computer network as well as customer requests received via e-mail, via fax or via the World Wide Web. Each of the components within the system is connected to a common computer network, thereby distributing the functionality among multiple components.

DESCRIPTION OF THE PREFERRED EMBODIMENT

Figure 1:
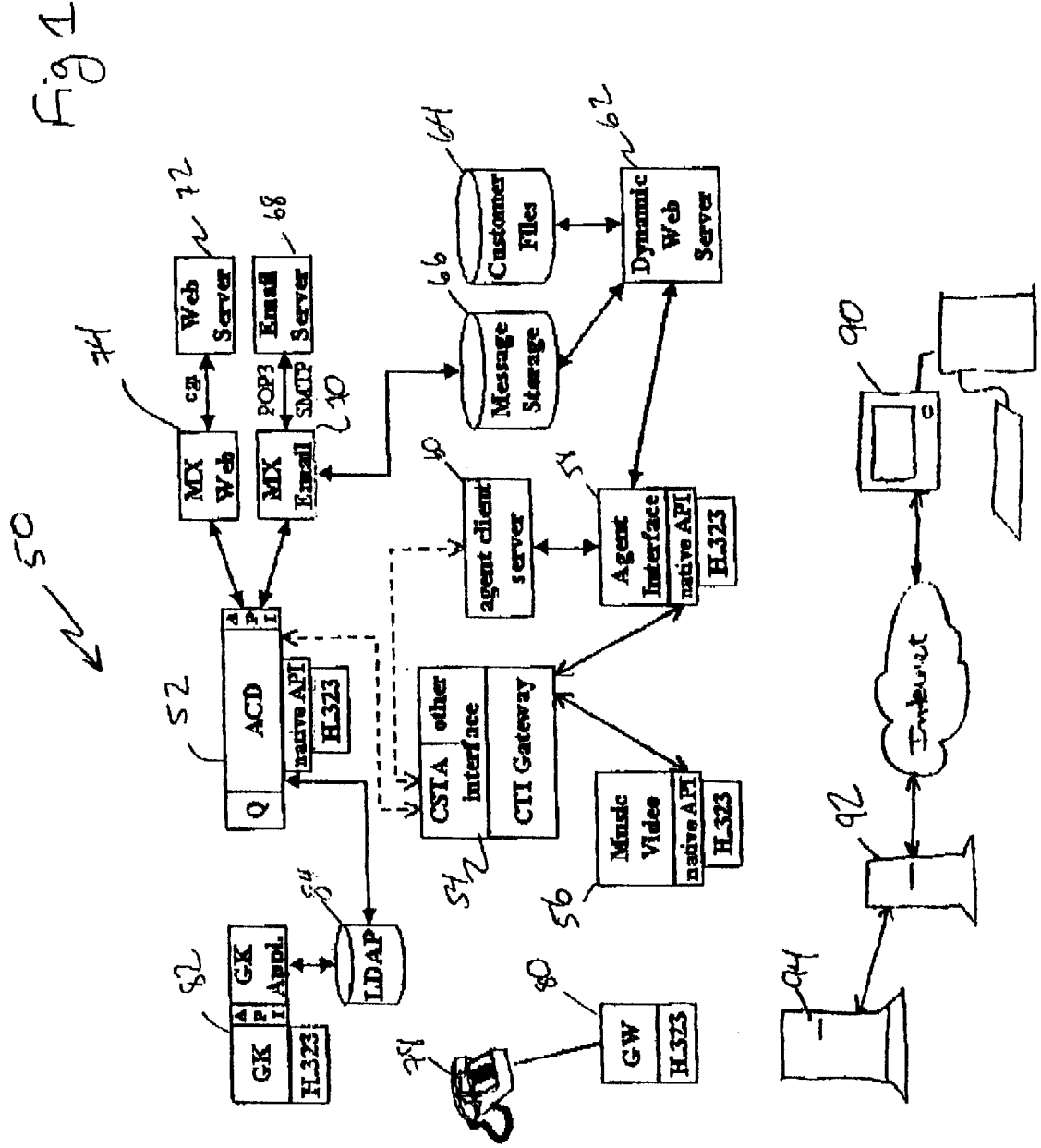
FIG. 1 is a block diagram of an automatic call distribution center according to the present invention.

FIG. 1 is a block diagram of the automatic call distribution system 50 according to the present invention. At the center of the system is an automatic call distribution server 52 that operates to monitor the status of various system components and to route calls from one component to another. The ACD server is designed to be H.323 compatible. H.323 is a telecommunication standard that is designed to handle multimedia telephone calls including voice calls received on the PSTN or on an Internet Protocol network. In addition, calls having a video component such as video conference calls or a data component using the t120 protocol can also be handled. The H.323 standard is considered to be well-known to those of ordinary skill in the telephone communication arts, and therefore need not be discussed in further detail except as the standard relates to the present invention.

System Overview

A computer telephony interface (CTI) gateway 54 operates to transfer calls between various system components under the direction of the ACD server 52. The CTI gateway 54 is accessed via a conventional CTI interface such as a CSTA, CSA, TAPI or JTAPI.

A music/video server 56 is provided to provide background music and announcements or video data to calls placed on hold within the automatic call distribution system when no customer agent is available. The music/video server 56 is H.323 compatible to receive multimedia telephone calls. In addition, an H.323 compatible Integrated Voice Response Unit (IVR)(not shown) is provided to allow a customer to communicate information to the ACD server using a DTMF keypad or audio responses. The IVR can receive multimedia telephone calls.

To interact with calling customers, the call distribution system includes a number of agent terminals 58 which typically include a H.323 compliant video telephone and integrated workplace. An agent client server 60 monitors the status of each of the agent terminals 58 and routes a call to a free agent when an agent terminal indicates that an agent is available. The agent client server 60 communicates with the CTI gateway 54 through the CTI interface.

The agent terminals 58 are in communication with a dynamic Web server 62 that can retrieve information from a customer file database 64 or a message storage database 66 and provides information to the agent interfaces using a conventional Web browser application or a database application.

To process customer requests that arrive via e-mail, the call distribution system 50 includes an e-mail server 68 and corresponding e-mail application program 70 that receives e-mail messages from users and supplies the messages to the ACD server 52 for transfer to an available agent.

In addition, callers may access the call distribution system through the Internet. Web based inquiries on the Internet are received by a Web server 72 and corresponding Web application 74. Requests for call-back received on the World Wide Web are supplied to the ACD server 52 for routing to an available agent who can view information supplied by a customer on a web page and can call the customer back.

As part of the H.323 standard, calls received from a remote telephone 78 via the PSTN are directed to a gateway 80 and are forwarded to a gatekeeper 82. The gatekeeper operates to determine an address for the destination of the call from a LDAP directory service 84.

As an alternative to receiving calls from the PSTN, calls may be received on a global wide area network such as the Internet or a corporate Intranet from a remote computer system 90. These calls may comprise audio and/or video information that is received at a firewall 92 which supplies the call to an Internet server 94. Calls from the Internet server 94 are supplied to the gatekeeper 82 to determine an address of the appropriate destination where the call should be routed. It is possible to eliminate the Internet server 94 if a remote computer is fully compliant with the automatic call distribution system 50 by supporting H.323 and the same set of complementary services supported by H.450.

Each of the components of the automatic call distribution system described above are interconnected via a local area computer network so that information and data can be passed from one component to another.

Having described the components of the automatic call distribution system, the following describes the manner in which they operate to route telephone calls or other messages from a customer to an available agent.

System Initialization

Before the automatic call distribution system can be used, the components of the system must be initialized. To begin, the ACD server 52, the call center agent terminals 58, as well as the music/video server 56 register their IP addresses with the gatekeeper 82. The ACD server 52 and agent client server 60 then open a session with the CTI gateway 54 via the CTI interface. This allows the ACD server 52 and the agent client server 60 to begin monitoring the state of a call at the music/video server 56 or any of the agent terminals 58. Similarly, the agent client server 60 sends commands to the CTI gateway 54 to begin monitoring the state of calls at the music/video server 56 and the agent terminals 58. Finally, the agent client server 60 sends commands to the CTI gateway to begin monitoring the state of calls at the agent terminals 58.

As the music/video server 56 and agent terminals 58 are started, a CTI component in their native application program interface registers with the CTI gateway 54. This enables them to deliver messages to and receive messages from the CTI gateway. If the CTI gateway received a monitoring request for a terminal, the CTI gateway delivers a message to the terminal that results in switching the monitoring functionality on the CTI component in the native application program interface.

The e-mail and Web applications 70, 74 register with the ACD server's messaging application program interface. This will allow the ACD server 52 to receive events from the e-mail or Web applications or send commands to them.

Routing Calls Where the ACD Server is an H.323 Endpoint

Figure 2:
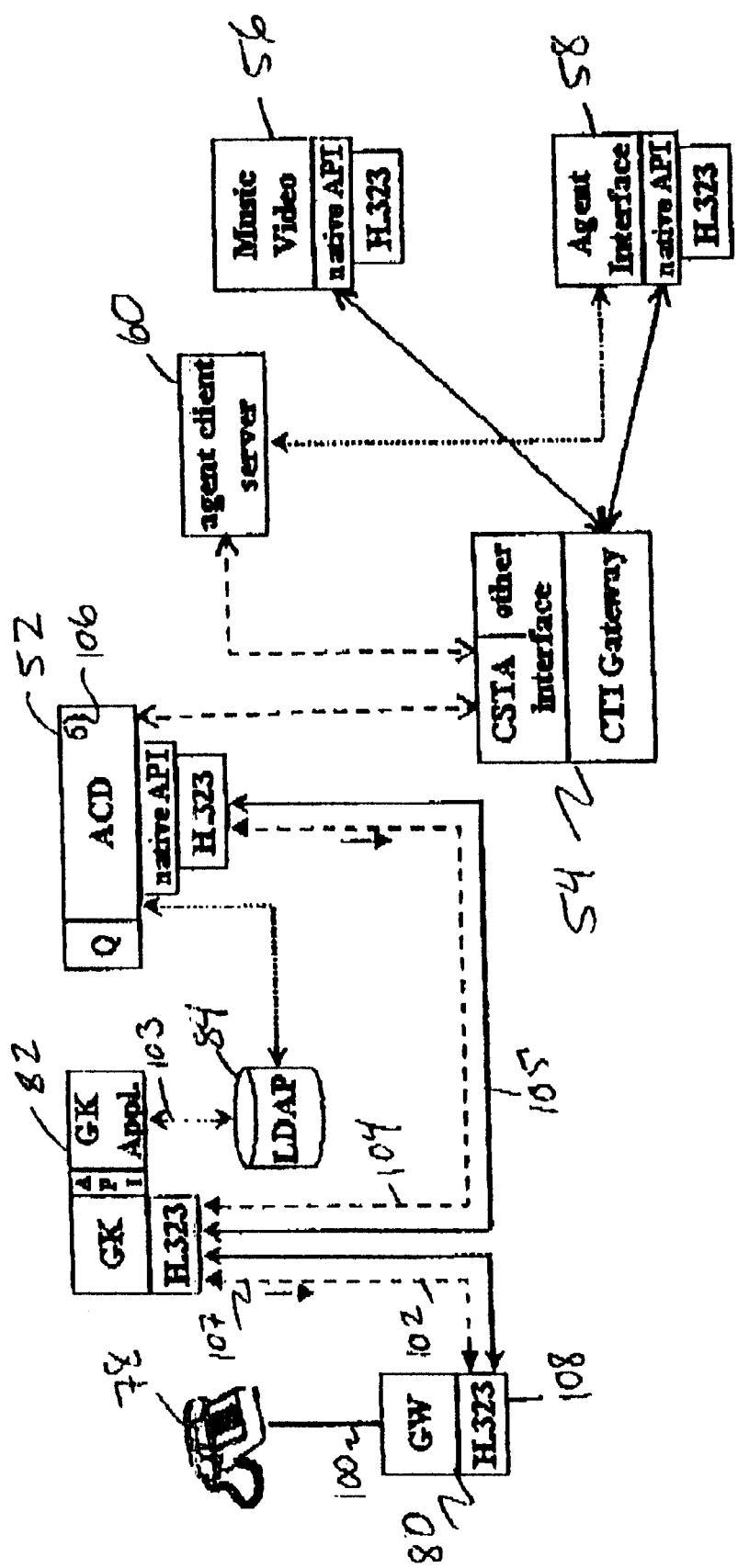
FIGS. 2, 3, and 4 are functional diagrams indicating how a telephone call is routed within the system if an automatic call distribution server within the automatic call distribution system is an H.323 end point.
Figure 3:
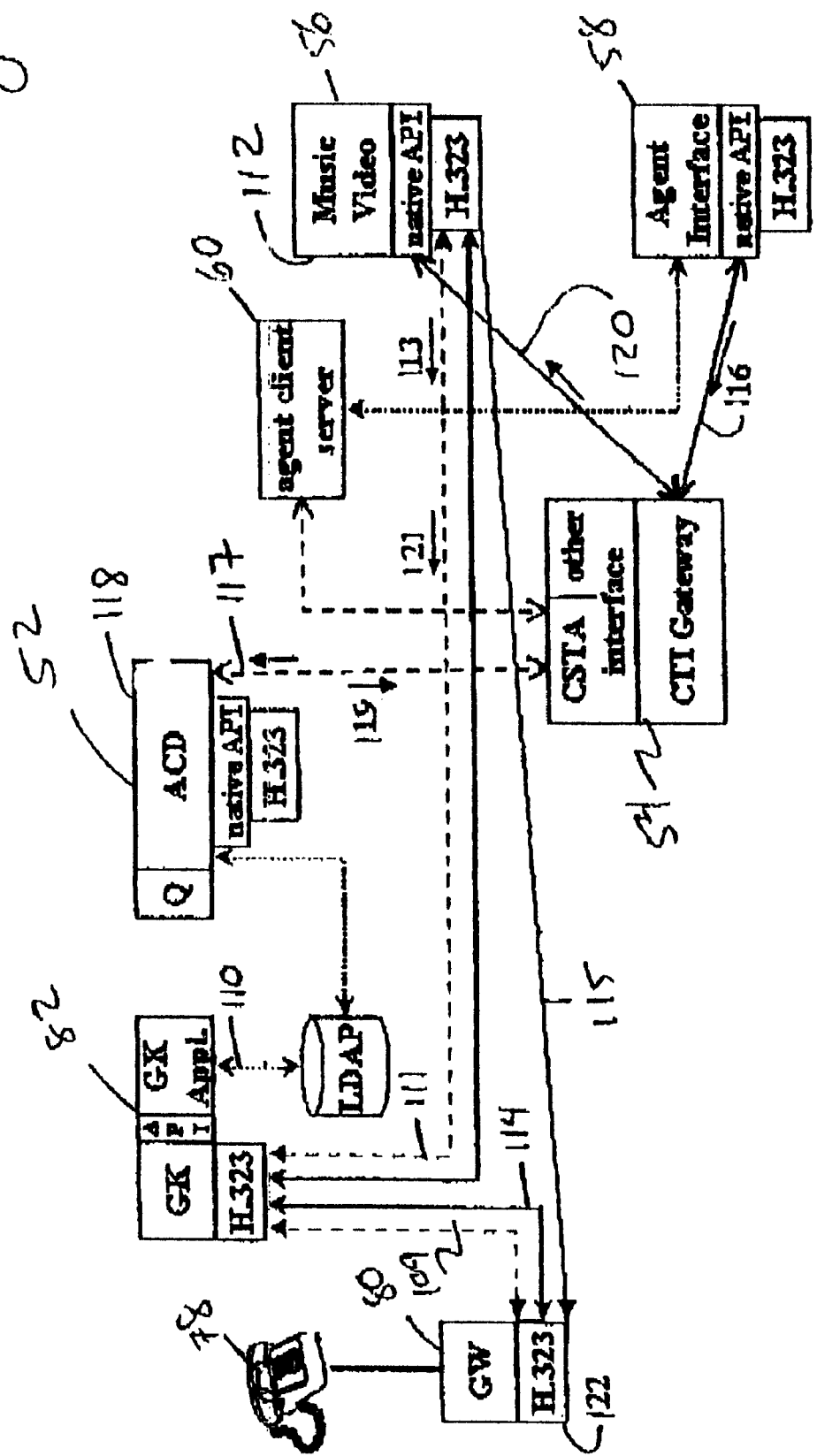

FIGS. 2 and 3 illustrate how the automatic call distribution system of the present invention routes a customer's voice call that arrives via the PSTN to a call center agent. The steps described below apply not only to voice calls but also video conference calls that arrive via the PSTN. The only difference being that payload channels for both the audio and video components of the call must be opened instead of only the audio payload channel as described below. Furthermore, the following scenario can also be used when a customer connects to the call distribution center via the Internet. In this case, however, the firewall 92 acts as the entry point instead of the PSTN gateway and replaces the PSTN/H.323 gateway in the following scenario.

Assuming that the ACD server 52 is an H.323 end point, a customer call is originated from a remote telephone 78 is received by the gateway 82 at a step 100. Upon receipt of the call from the central office, the gateway 82 opens up an H.225 RAS channel to the gatekeeper 82 via the H.323 stack at a step 102. The gateway provides the gatekeeper with information such as the number of the called party within an RAS ARQ message.

At a step 103, the gatekeeper translates the called party number (or one of a number of aliases) into a transport address, i.e., an IP address plus port number, for the ACD server 52 using the LADP database 84. The transport address is then returned to the gateway by means of an RAS ACF message. The transport address is then used at a step 104 to establish an H.225 reliable channel between the gateway 80 and the ACD server 52 through the gatekeeper 82. This is followed at a step 105 by the opening of an H.245 reliable channel between the gateway 80 and the ACD server 52 through the gatekeeper 82. In reaction to this, the ACD server 52 places a reference for this call into the queue at a step 106. In addition, the ACD server 52 determines if an agent is available who can handle the call. If the ACD server determines that no agent is available, the ACD performs a routing step that determines if the call must be redirected, i.e., transferred or forwarded, depending upon the state of the H.225 call state between the gateway and the ACD server, to the music/video server 56 or IVR. In order to transfer the call to the music/video server (assuming the call was in an active state), the ACD sends the gateway a transfer command at a step 107 via an H.225 facility message. This message contains a facility-UUIE with a corresponding facility reason, if the H.450.2 standard is not implemented, or an H.225 facility message containing an H.450 call transfer initiate invoke APDU, if the H.450.2 standard is implemented. This message contains the address of the transferred to end point, i.e., the music/video server 56.

As an alternative to transferring the call, the call can be forwarded, if no H.225 connect was set so far, via an H.225 facility message containing facility-UUIE with corresponding facility reason (if the H.450.3 standard is not yet implemented) or an H.225 facility message containing H.450 call forwarding reroute invoke (if the H.450.3 standard is implemented). The gateway receives the transferred or forwarded call at a step 108 and answers by tearing down the H.225 /H.245 signaling connections with the ACD server.

As shown in FIG. 3, the gateway sets up in steps 109–111 new H.225 signalling channels via the gatekeeper to the music/video server 56 in a manner similar to steps 102–104. Optionally, the address resolution at step 110 can be omitted if the transport address rather than an alias address, of the music/video server 56 was provided in the transfer or forward message.

Opening the H.225 signaling channel between the gateway 80 and the music/video server 56 via the gatekeeper 82, alerts the music/video server 56 at a step 112. The music/video server reacts at a step 113 by sending back a connect message containing the transport address of the H.245 channel. The H.245 channel is then established at a step 114 followed by a terminal capability exchange master/slave determination and the opening of a logical transmit channel by the music/video server to the gateway for the payload at a step 115. The music/video server 56 declines the incoming request from the gateway 80 to open a payload channel from the gateway to the music/video server direction. This results in a one way connection that can be used to deliver a combination of music/video and recorded announcements to the caller connected to the gateway. This connection is maintained until either the customer's phone goes on hook or a call center agent becomes available.

When a call center agent becomes available, the CTI component of the native API of the agent terminal sends a message at a step 116 to the CTI gateway with which it is registered. This message indicates that the agent is now available. The CTI gateway receives this message and sends an analogous message via the CTI interface to the ACD server at a step 117.

At a step 118, the ACD server 52 changes the state information to reflect the fact that an agent is now available. After the ACD server 52 decides that enough time has elapsed since the agent became available, the ACD server initiates the transfer of the call from the music/video server 56 to the agent terminal 58. To accomplish this, the ACD server sends a transfer command to the CTI gateway via the established CTI interface at a step 119. As a reaction to this, the CTI gateway sends a transfer command to the CTI component in the music/video server's native API at a step 120. This transfer command causes the CTI component to invoke the transfer command at the H.323 stack, which results in an H.225 facility message being sent from the music/video server to the gateway 80 through the gatekeeper 82 at a step 121. This message contains a facility-UUIE with corresponding facility reason (if the H.450.2 standard is not yet implemented) or a facility message containing an H.450 call transfer initiate invoke (if the H.450.2 standard is implemented).

As will be appreciated, the above described steps allow for third party control of an H.323 endpoint. By configuring an endpoint's API to accept call control messages and to process those messages as if they were generated by the endpoint's own application, calls can be handled by a third party which in the present application is the ACD server 52.

Figure 4:
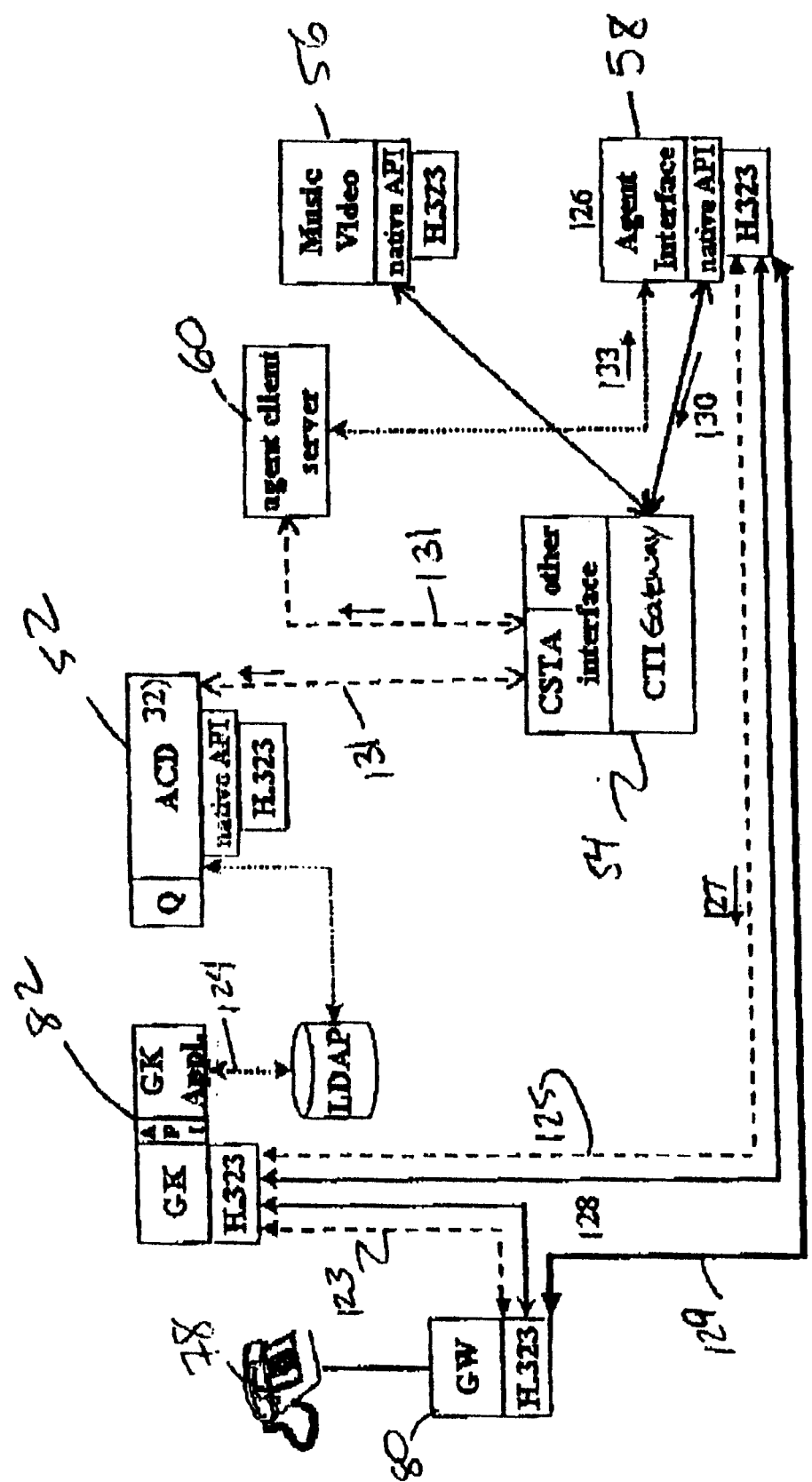

Similar to the actions taken at step 108, the gateway closes the H.225 /H.245 channels and the payload channel between the gateway and the music/video server at a step 122. As shown in FIG. 4, the gateway opens the H.225 channels to the free agent's terminal in steps 123–125 in a manner that is similar to steps 109–111. This causes the agent terminal application to alert the agent that a call is coming in at a step 126. After the agent indicates that he or she is able to answer the call, the client application triggers the client stack to send a connect message at a step 127 followed by a channel establishment, terminal capability exchange and master/slave determination at a step 128. At a step 129, the payload channels between the ACD client and the gateway are open using regular H.245 open logical channel procedures (unidirectional channels in both directions). Now the customer and agent can start a conversation.

After the call was active with logic channels being established, the CTI component of the agent terminals native API delivers a message to the CTI gateway at a step 130. The message indicates that the agent's state has changed from available to busy. The CTI gateway receives the agent busy message and sends an analogous message via the CTI interface to the ACD server at a step 131. At a step 132, the ACD server changes the state information to reflect the fact that the agent is now busy. Furthermore, the ACD server updates the reference information for this call that is kept in the queue. The queue entry will reflect the waiting time at the music/video server and the fact that the customer is now talking with an agent.

The agent client server 60 also receives any CTI messages used to alert the ACD server of an even earlier message during the call setup at a step 131. The agent client server reacts to the incoming message by sending a message to the agent terminal at a step 133. This message alerts the agent user interface to update itself and perform other actions such as a database pop-up to display the callers database entry.

After the conversation is completed and either the agent or customer goes on hook, the H.225 /H.245 and the payload channels are closed either by the H.323 stack at the agent terminal or at the gateway. Furthermore, the CTI component of the agent terminal's native API delivers a message to the CTI gateway 54 indicating that the call was completed. The CTI gateway 54 receives this message and sends an analogous message via the CTI interface to the ACD server 52. The ACD server updates the reference information for this call that is kept in the queue. The queue entry will reflect the time the customer was connected to the agent.

Call Routing if ACD Server is Not an H.323 Endpoint

It is not required that the ACD server 52 be an H.323 end point. The automatic call distribution center wherein the ACD server is not an H.323 end point differs only from the architecture described above in the set-up phase. When the ACD server is an H.323 end point, it receives a call and retrieves relevant information about the caller through the H.225 signaling channel that is initially set up. Other information such as the call capabilities are retrieved via the H.245 protocol that is established after the H.225 protocol. However, the call capability information is already available when the H.225 channel is connected to the gatekeeper. The following describes how an incoming call can be directly forwarded to the music/video server 56 if all agents are unavailable, or to an available agent. If the ACD server is not an H.323 end point, it is not required that an incoming call first establish signaling channels with an intermediate end point before establishing a connection to the music/video server 56 or an agent terminal 58.

Figure 5:
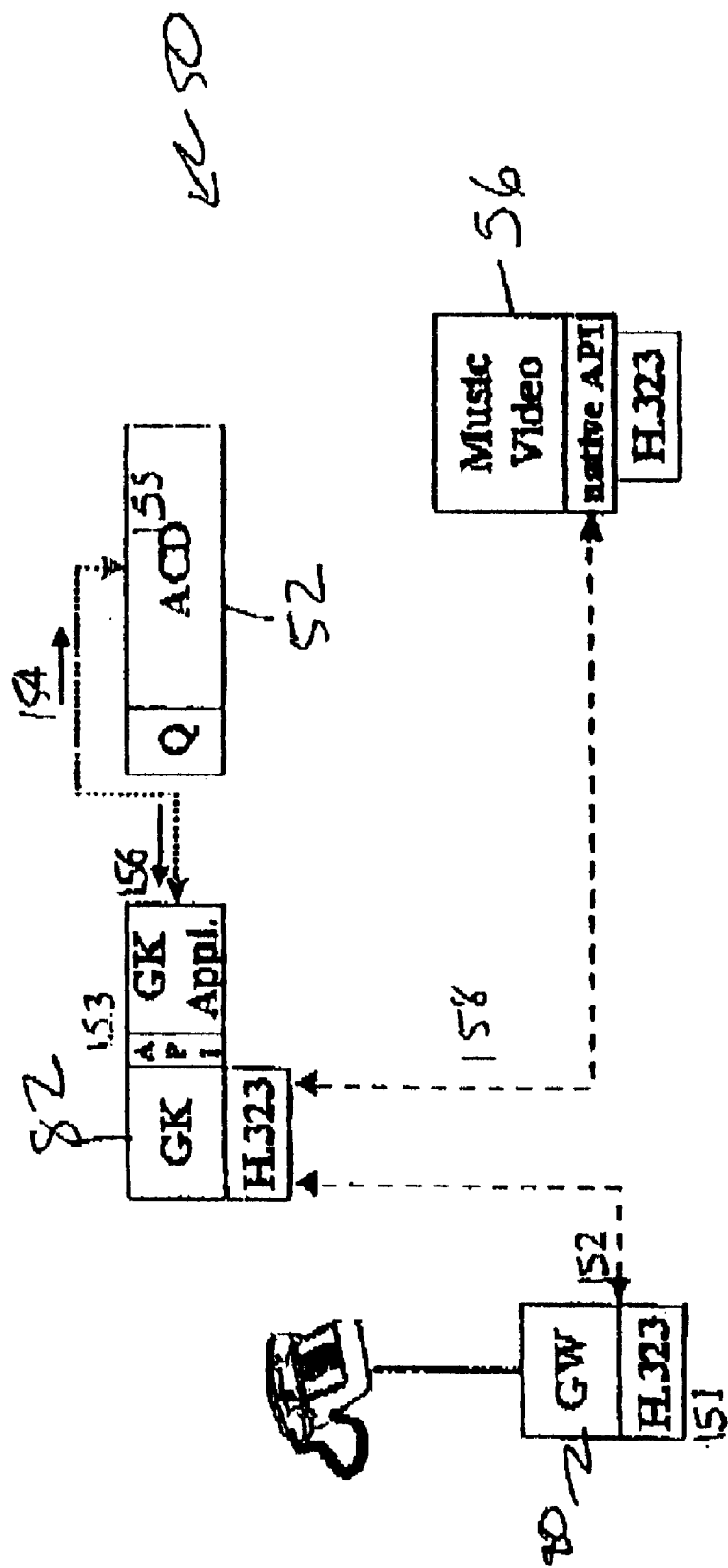
FIG. 5 illustrates how a call is routed to a music/video server in the case the ACD is not an H.323 endpoint using information provided by the gatekeeper.

As shown in FIG. 5 beginning at a step 151, the customer calls the call distribution system 50 via the PSTN. The gateway 80 receives the call from the central office and opens via the H.323 stack the H.225 RAS channels to the gatekeeper 82 to provide information such as the called party number of this call within the RAS ARQ message at a step 152. At a step 153, the gatekeeper 82 hands the incoming call information to the gatekeeper application via an API. In this case, the gatekeeper application determines that the called party number of the call was the call center number. As a result, it provides the incoming call information to the ACD server 52 at a step 154 via a data connection.

The ACD server 52 determines at a step 155 which agent group is responsible for this call and decides if an agent in the group is available. If an agent in the group is not available, the ACD server determines in a route step that the call must be forwarded to the music/video server 56. Therefore, the ACD server 52 returns the IP address of the music/video server to the gatekeeper application at a step 156.

The gatekeeper 82 establishes an H.225 connection to the music/video server 56 at a step 158 using the provided information from the ACD server. Subsequently, an H.245 channel and the logical channels will be established between the gateway 80 and the music/video server 56 through the gatekeeper 82 in the same way that occurs when the ACD server is an H.323 end point.

Figure 6:
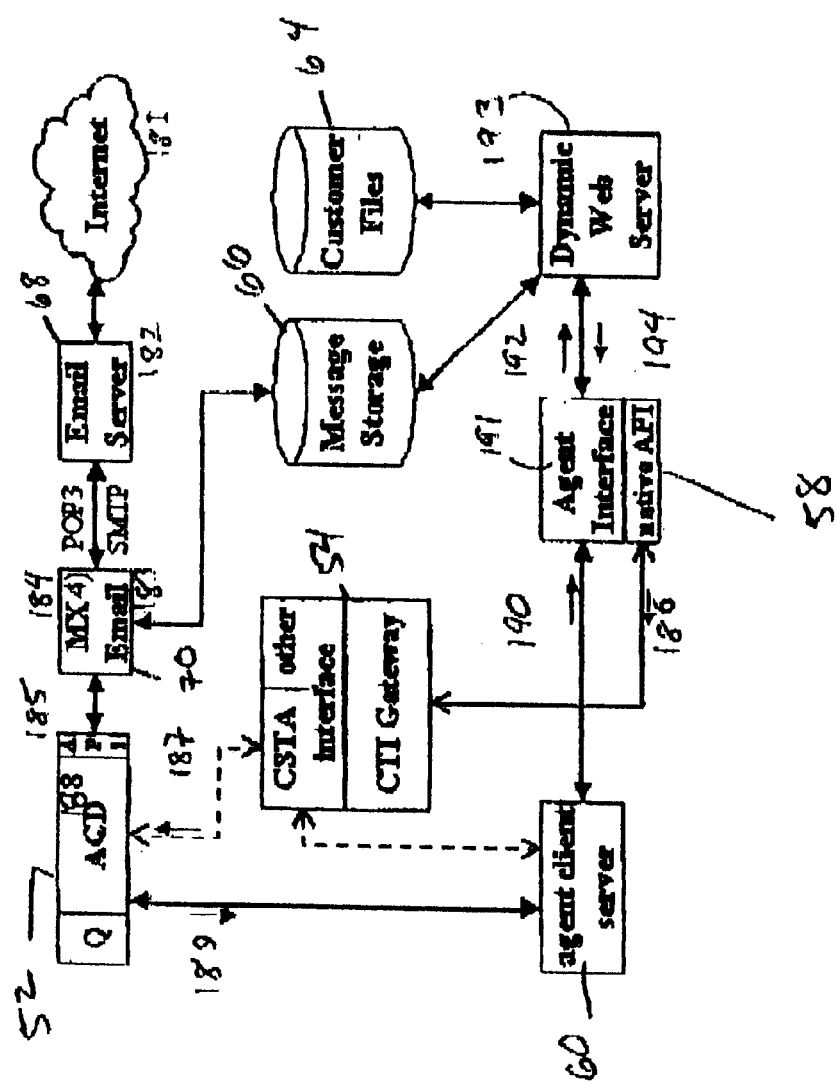
FIG. 6 illustrates how the automatic call distribution system responds to e-mails received on the Internet.

The description given above indicates how the automatic call distribution system of the present invention responds to incoming telephone calls received on either the PSTN or on the Internet. However, the present invention is also useful for responding to questions that arrive from a customer via electronic mail. These mail messages are forwarded to an available agent wherein they are answered and returned to the customer. As shown in FIG. 6, a customer writes an electronic mail message and sends it to the call distribution system at the call distribution system's e-mail address at a step 181. The e-mail server 68 receives the e-mail from the Internet at a step 182 and the e-mail application 70 monitors the e-mail server to determine the arrival of new messages. If a new e-mail message has been received, the e-mail application 70 will retrieve any new messages at a step 183. At a step 184, the e-mail application 70 will extract the customer's name, the return address of the e-mail, the time the e-mail arrived at the call distribution system, the subject line and the body of the e-mail message and store this information in the message storage database 66. Depending upon the configuration of the e-mail application, the application will also perform a classification of the message or content of the message based on a natural language processing of the message text. The classification is also stored in the message storage database 66.

At a step 185, the e-mail application 70 signals the ACD server 52 that a new e-mail has been received. As a result, the ACD server 52 retrieves from the e-mail application an e-mail reference and other information about the e-mail that is required to perform the routing steps. Afterwards, the ACD server 52 determines the agent group that will handle the e-mail message and inserts it into an appropriate queue.

As a call center agent becomes available, the CTI component of the native API of the agent terminal sends a message to the CTI gateway 54 with which it is registered at a step 186. This message indicates that an agent is now available. The CTI gateway receives this agent available message and sends an analogous message via the CTI interface to the ACD server 52 at a step 187.

At a step 188, the ACD server 52 changes the state information to reflect that an agent is now available. As the ACD server 52 decides that enough time has elapsed after the agent has become available, the ACD server will transfer the e-mail message to the agent/client server at a step 189. The ACD server then changes the state information for the particular agent who received the e-mail message to "busy".

By sending a message to the agent/client server at the step 189, the agent client server is informed that the agent will receive an e-mail message at the agent workplace. The message contains an identification number for the e-mail that is stored in the messaging storage database 66.

The agent/client server reacts at a step 190 to the incoming message by sending a message to the agent terminal 58. This message will change the agent terminal's user interface in a way that reflects the fact that the agent became busy at a step 191. Furthermore, the agent terminal transmits the identification number for the e-mail and other information required for accessing the message storage to the dynamic Web server 62. As a result of this request, the dynamic Web server 62 generates an HTML Web page based on a pre-defined template that contains the e-mail message and some user interface elements at a step 193. The dynamic Web server retrieves the e-mail message from the message storage database 66 using the e-mail identification number provided by the agent interface as part of the Web request. The Web server delivers the resulting Web page to the agent terminal's user interface at a step 194 wherein it is displayed in a Web browser or rendering component. The message could also be displayed in any other graphical user interface or even a text-based user interface.

The agent can now start to read the e-mail and create an answer. The user interface elements that are embedded in the Web page will support the forwarding and send functionality needed to send a reply to the sender of the e-mail inquiry.

In the scenario described above, the e-mail message can only be forwarded to an available agent. However, other routing steps such as sending an acknowledgment that an e-mail was received, queuing a call to the customer if the e-mail message contains a call-back request and sufficient information about the time and the customer's telephone numbers available or automatic delivery of requested electronic documents via an attachment could be provided.

In addition, the architecture can be programmed such that a call is placed via the PTSN gateway or via an Internet gateway to the customer as soon as the agent receives the e-mail at his or her terminal. Finally, the call center agent can review the e-mail first before he or she starts a call by interaction with the user interface of their agent terminal 58.

Fax Integration into the H.323 Automatic Call Distribution System

Incoming queries from customers can be received by facsimile in much the same way as they are received by e-mail messages. However, a fax is received by a fax server and forwarded to a corresponding fax application. In the simplest case, the fax application renders all fax pages as a picture (e.g., in GIF format) and stores them in a message storage database 66. The fax application might perform optical character recognition and text analysis similar to the e-mail application to retrieve additional information useful for routing the facsimile message. The facsimile message can be displayed at the user interface via the Web browser in a manner similar to e-mail messages.

Web Integration into the H.323 Automatic Call Distribution Center

Yet another alternative way of accessing the automatic call distribution system is via a World Wide Web browser such as provided by Microsoft or Netscape. The following describes how a customer's message and Web request for a call-back can be captured and how a call between a call center agent and a customer is set up.

As shown in FIGS. 7 and 8, a customer reviews a corporate Web page with a web browser and determines that he or she is interested in talking with a call center agent at a step 201. The customer completes one or more forms of the corporate Web pages. The forms contain the customer's name, phone number and the time that the customer wants to be called back and if necessary, additional textual information regarding the nature of their inquiry.

After the customer submits the Web request, the provided information is sent via the Internet and the corporate Web server to the Web application at a step 202. The Web application stores the information in the message storage database 66. Depending upon the configuration of the Web application, the Web application also performs a classification of the message or content based on a natural language processing of the message text. These results can also be stored in the message storage database 66.

At a step 204, the Web application 74 submits a new request to the ACD server 52. The submitted request contains a reference to the text message or other information about the Web request required to perform the routing steps. Afterwards, the ACD server 52 determines which ACD group of agents will handle the Web request and inserts it into an appropriate queue for those agents.

As a call center agent becomes available, the CTI component of the native API of the agent terminal sends a message to the CTI gateway that it is registered with at a step 205. This message indicates that an agent is now available. The CTI gateway receives this message and sends an analogous message via the CTI interface to the ACD server 52 at a step 206.

At a step 207, the ACD server 52 changes the state information to reflect that an agent is now available. After the ACD server 52 decides that enough time has elapsed after the agent has become available, the ACD server 52 will transfer the Web request to the agent terminal. As a first step, the ACD server 52 changes the state information for the agent to "busy".

The ACD server 52 then uses third-party control to set up a call from the selected agent to the customer. At a step 208, the ACD server sends a "make call" command to the CTI gateway via the CTI interface. As a reaction to this command, the CTI gateway sends the make call command to the CTI component in the native API of the agent/client server 60 at a step 209. Optionally, the incoming command results in alerting the agent who must accept the outgoing call before the call is actually initiated.

This make call command causes the CTI component to set up a call to the customer via the gateway at a step 210. Address resolution and other steps will be performed according to the scenario described in conjunction with steps. After the customer picks up the phone, the gateway creates the H.245 channel and the payload channel to the agent terminal in steps 211 and 212.

After the call is active with the logical channels being established, the CTI component of the agent terminals native API delivers a message to the CTI gateway with which it is registered at a step 213. This message indicates that the agent is now connected with the customer. The CTI gateway 54 receives this message and sends an analogous message via the CTI interface to the ACD server in a step 214. As a reaction to this message, the ACD server 52 places a reference for this call into the queue at a step 215.

In parallel with step 214, the same message indicating that the agent is connected with the customer is delivered by the CTI gateway 54 via the CTI interface to the agent client server 52 at a step 216. The agent client server reacts to the incoming message by sending a message to the agent terminal at a step 217. This message will change the user interface in a way that reflects the fact that the agent has become busy at a step 218. At a step 219, the agent terminal 58 transmits the identification number for the Web message and other information required for accessing the message storage database to the dynamic Web server 62. As a result of this request, the dynamic Web server generates an HTML Web page based on a predefined template that contains the Web message, the customer name, and some user interface elements at a step 220. The dynamic Web server 62 retrieves the Web request from the message storage database 66 using the Web identification number provided by the agent interface as part of the Web request. The dynamic Web server 62 delivers the resulting Web page to the user interface at a step 221 where it is displayed in a Web browser or a rendering component.

As can be seen from the above description, the present invention is an automatic call distribution system that allows an agent to interact with a customer via a plurality of mediums. In addition, the functionality of the system is distributed among various components thereby reducing the complexity while enhancing the features that can be provided. Although the present invention has been described with respect to its preferred embodiments, those skilled in the art will recognize that changes could be made. For example, instead of maintaining links to the CTI components in all of the potentially monitored terminals, the CTI gateway could receive event streams from the gatekeeper via an API and induce commands into the H.225 and H.245 event streams at the gatekeeper accordingly. When used for gatekeeper routed calls, the gatekeeper would be required to report all events that are routed through it and be able to insert messages into established call control channels.

What is claimed is:

1. An automatic call distribution system for routing customer inquiries to one or more service agents, comprising:
   a plurality of agent terminals, coupled to a computer network;
   an automatic call distribution server, coupled to said computer network, that receives inquiries in a variety of media forms, determines when an agent terminal is available, and routes the multimedia inquiries to an available agent terminal;
   a gateway that receives telephonic inquiries on a public switched telephone network; and a gatekeeper coupled to the gateway for directing the telephonic inquiries from the gateway to said automatic call distribution server;

a music/video server capable of providing music/video and announcements, coupled to the computer network, to which an inquiry can be routed by the automatic call distribution server when no agent terminals are available;

a firewall server and Internet server coupled to the computer network that receives inquiries in a variety of media forms on an Internet Protocol network and routes said inquiries to the automatic call distribution server, that in turn routes the inquiries to an available agent terminal as determined by said automatic call distribution server;

an e-mail server that receives e-mail messages from a customer that are routed by the automatic call distribution server to an available agent terminal;

a web server that receives web requests, including a customer name and call back number from the Internet, the automatic call distribution server routing the web request to an available agent terminal; and a gateway coupled to the plurality of agent terminals and the automatic call distribution server, the CTI gateway monitoring the status of the plurality of agent terminals and informing the automatic call distribution server when an agent terminal is available.

2. The multimedia call distribution system of claim 1, wherein the gateway and the plurality of agent terminals are H.323 endpoints.

3. The multimedia call distribution system of claim 2, wherein the automatic call distribution server is an H.323 endpoint.

4. The multimedia call distribution system of claim 1, wherein multimedia calls can be generated at the plurality of agent terminals by the automatic call distribution server.

\* \* \* \* \*